(12) United States Patent
Rowe (10) Patent No.: US 11,289,924 B2
(45) Date of Patent: Mar. 29, 2022

(54) BATTERY PACK INCLUDING A HIGH- AND LOW-CURRENT DISCHARGE TERMINALS

(71) Applicant: TECHTRONIC CORDLESS GP, Anderson, SC (US)

(72) Inventor: Tyler J. Rowe, Anderson, SC (US)

(73) Assignee: TECHTRONIC CORDLESS GP, Anderson, SC (US)

( * ) Notice: Subject to any disclaimer, the term of this patent is extended or adjusted under 35 U.S.C. 154(b) by 273 days.

(21) Appl. No.: 16/536,422

(22) Filed: Aug. 9, 2019

(65) Prior Publication Data

US 2021/0044122 A1  Feb. 11, 2021

(51) Int. Cl.
*H02J 7/00* (2006.01)
*H01M 50/543* (2021.01)
(Continued)

(52) U.S. Cl.
CPC .............. *H02J 7/0031* (2013.01); *B25F 5/02* (2013.01); *H01M 10/058* (2013.01);
(Continued)

(58) Field of Classification Search
CPC ...... H02J 7/0031; H02J 7/0044; H02J 7/0013; H02J 7/00; H01M 50/543; H01M 50/572;
(Continued)

(56) References Cited

U.S. PATENT DOCUMENTS 5,122,427 A * 6/1992 Flowers .............. H01M 50/572
  429/97
5,335,133 A   8/1994 Bishop et al.
(Continued)

FOREIGN PATENT DOCUMENTS

CN    1322395 A    11/2001
CN    2479648 Y    2/2002
(Continued)

OTHER PUBLICATIONS

Extended European Search Report for Application No. 20190324.2 dated Dec. 18, 2020 (9 pages).

*Primary Examiner* — M Baye Diao
(74) *Attorney, Agent, or Firm* — Michael Best & Friedrich LLP (57) ABSTRACT

Embodiments described herein provide a battery pack that includes a housing and a plurality of battery cells. The housing includes a support portion that is configured to removably connect to a device, such as a cordless, hand-held power tool. The battery pack is configured to electrically and/or communicatively connect to a device through at least one terminal. The at least one terminal can include a high-current discharge terminal and a common ground terminal. The battery pack is also configured to electrically and/or communicatively connect to device through a low-current discharge terminal and the common ground terminal. A current limiting circuit is connected between the plurality of battery cells and the low-current discharge terminal to limit the discharge current from the low-current discharge terminal. Both the high-current discharge terminal and the low-current discharge terminal provide the same value for output voltage (e.g., 18V).

20 Claims, 12 Drawing Sheets

(51) Int. Cl.
*H01M 50/572* (2021.01)
*H01M 50/213* (2021.01)
*B25F 5/02* (2006.01)
*H01M 10/058* (2010.01)
*H01M 10/42* (2006.01)

(52) U.S. Cl.
CPC ..... *H01M 10/4207* (2013.01); *H01M 50/213* (2021.01); *H01M 50/543* (2021.01); *H01M 50/572* (2021.01); *H02J 7/0044* (2013.01); *H01M 2220/30* (2013.01); *H02J 7/00304* (2020.01)

(58) Field of Classification Search
CPC ............. H01M 50/213; H01M 10/058; H01M 10/4207; H01M 2220/30; H01M 50/20; H01M 50/502; H01M 2010/4271; H01M 10/425; H01M 10/441; B25F 5/02; Y02E 60/10
USPC ......................................................... 320/112
See application file for complete search history.

(56) References Cited

U.S. PATENT DOCUMENTS

| | | | |
|---|---|---|---|
| 5,412,308 | A | 5/1995 | Brown |
| 7,365,516 | B2 | 4/2008 | Leyten et al. |
| 7,804,275 | B2 | 9/2010 | Dellacona |
| 9,397,506 | B2 | 7/2016 | Keates |
| 9,438,113 | B2 | 9/2016 | Wyatt et al. |
| 9,680,318 | B2 | 6/2017 | Carkner et al. |
| 9,837,811 | B2 * | 12/2017 | Yamaguchi ........... H01M 10/48 |
| 10,141,551 | B2 | 11/2018 | Choi et al. |
| 2010/0190052 | A1 * | 7/2010 | Rajani .................. H01M 10/46 429/178 |
| 2012/0045667 | A1 * | 2/2012 | Yoneda ................ H01M 50/216 429/7 |
| 2013/0244504 | A1 * | 9/2013 | Ogura .................. H01R 13/113 439/759 |
| 2014/0342190 | A1 | 11/2014 | Tamburrino |
| 2016/0241065 | A1 * | 8/2016 | Kondo ................. H01M 50/543 |
| 2016/0260943 | A1 | 9/2016 | Tamburrino |
| 2017/0072553 | A1 | 3/2017 | Bakker |
| 2017/0222454 | A1 | 8/2017 | Bakker |
| 2017/0264116 | A1 | 9/2017 | Carkner et al. |
| 2017/0288436 | A1 | 10/2017 | Reed |
| 2018/0277801 | A1 * | 9/2018 | Brozek ................ H01M 50/557 |
| 2018/0301912 | A1 | 10/2018 | Shen et al. |

FOREIGN PATENT DOCUMENTS

| | | |
|---|---|---|
| CN | 2572568 Y | 9/2003 |
| CN | 201174405 Y | 12/2008 |
| CN | 201518341 U | 6/2010 |
| CN | 201797336 U | 4/2011 |
| CN | 203086179 U | 7/2013 |
| CN | 203734332 U | 7/2014 |
| CN | 104064720 A | 9/2014 |
| CN | 204102977 U | 1/2015 |
| CN | 205029551 U | 2/2016 |
| CN | 105576756 A | 5/2016 |
| CN | 107294489 A | 10/2017 |
| CN | 107302248 A | 10/2017 |
| CN | 206865197 U | 1/2018 |
| CN | 207021730 U | 2/2018 |
| CN | 107910490 A | 4/2018 |
| CN | 108963323 A | 12/2018 |
| CN | 109038711 A | 12/2018 |
| GB | 253117 | 9/1927 |
| TW | 201236316 A | 9/2012 |
| TW | M461242 Y | 9/2013 |
| WO | 2018109488 A1 | 6/2018 |

* cited by examiner

BATTERY PACK INCLUDING A HIGH- AND LOW-CURRENT DISCHARGE TERMINALS

FIELD

Embodiments described herein relate to a battery pack for powering a device.

SUMMARY

Embodiments described herein provide a battery pack that includes a housing and a plurality of battery cells. The housing includes a support portion that is configured to removably connect to a device, such as a cordless, hand-held power tool. The battery pack is configured to electrically and/or communicatively connect to the device through at least one terminal. The at least one terminal can include a high-current discharge terminal and a common ground terminal. The high-current discharge terminal is configured to output a current having a first value (e.g., at least 20 Amps). The battery pack is also configured to electrically and/or communicatively connect to device through a low-current discharge terminal and the common ground terminal. The low-current discharge terminal is configured to output a current having a second value (e.g., less than 10 Amps). A current limiting circuit is connected between the plurality of battery cells and the low-current discharge terminal to limit the discharge current from the low-current discharge terminal.

Embodiments described herein provide a battery pack that includes a housing, a plurality of battery cells located within the housing, a current limiting circuit, a first battery pack terminal, a second battery pack terminal, and a third battery pack terminal. The housing includes a battery pack support portion configured to removably mechanically connect the battery pack to a device. The battery pack support portion includes a first rail, a second rail, and a coupling mechanism for securing the battery pack to the device. The plurality of battery cells include a highest-potential battery cell and a lowest-potential battery cell. The current limiting circuit is connected to a positive terminal of the highest-potential battery cell. The first battery pack terminal is configured to electrically connect the battery pack to the device. The first battery pack terminal is connected to the positive terminal of the highest-potential battery cell. The second battery pack terminal is configured to electrically connect the battery pack to the device. The second battery pack terminal is connected to the current limiting circuit. The third battery pack terminal is configured to electrically connect the battery pack to the device. The third battery pack terminal is connected to a negative terminal of the lowest-potential battery cell. The current limiting circuit limits an electrical current that can be discharged from the second battery pack terminal to a value that is lower than an electrical current that can be discharged from the first battery pack terminal.

In some embodiments, the electrical current that can be discharged from the first battery pack terminal is an average discharge current of at least 20 Amps. In some embodiments, the electrical current that can be discharged from the second battery pack terminal is limited by the current limiting circuit to less than 10 Amps. In some embodiments, the current limiting circuit includes a switch. In some embodiments, the switch includes a field-effect transistor. In some embodiments, the battery pack is configured to electrically connect to a drain terminal of the field-effect transistor; and the second battery pack terminal is configured to electrically connect to a source terminal of the field-effect transistor. In some embodiments, an output voltage at the first battery pack terminal is approximately equal to an output voltage at the second battery pack terminal.

Embodiments described herein provide a battery pack that includes a housing, a plurality of battery cells located within the housing, a current limiting circuit, a first battery pack terminal, and a second battery pack terminal. The housing includes a battery pack support portion configured to removably mechanically connect the battery pack to a device. The battery pack support portion includes a first rail, a second rail, and a coupling mechanism for securing the battery pack to the device. The current limiting circuit is connected to the plurality of battery cells. The first battery pack terminal is configured to electrically connect the battery pack to the device. The first battery pack terminal is connected to the plurality of battery cells. The second battery pack terminal is configured to electrically connect the battery pack to the device. The second battery pack terminal is connected to the current limiting circuit. The current limiting circuit limits an electrical current that can be discharged from the second battery pack terminal to a value that is lower than an electrical current that can be discharged from the first battery pack terminal.

In some embodiments, the first battery pack terminal is connected to a positive terminal of a highest-potential battery cell in the plurality of battery cells, the current limiting circuit is connected to the positive terminal of the highest-potential battery cell, and the second battery pack terminal is connected to the current limiting circuit. In some embodiments, the electrical current that can be discharged from the first battery pack terminal is an average discharge current of at least 20 Amps. In some embodiments, the electrical current that can be discharged from the second battery pack terminal is limited by the current limiting circuit to less than 10 Amps. In some embodiments, the current limiting circuit includes a switch. In some embodiments, the switch includes a field-effect transistor. In some embodiments, an output voltage at the first battery pack terminal is approximately equal to an output voltage at the second battery pack terminal.

Embodiments described herein provide a battery pack that includes a housing, a plurality of battery cells located within the housing, a current limiting circuit, a first battery pack terminal, and a second battery pack terminal. The housing including a battery pack support portion is configured to removably mechanically connect the battery pack to a device. The current limiting circuit is connected to the plurality of battery cells. The first battery pack terminal is configured to electrically connect the battery pack to the device. The first battery pack terminal is connected to the plurality of battery cells. The second battery pack terminal is configured to electrically connect the battery pack to the device. The second battery pack terminal is connected to the current limiting circuit. The current limiting circuit limits an electrical current that can be discharged from the second battery pack terminal to a value that is lower than an electrical current that can be discharged from the first battery pack terminal.

In some embodiments, the first battery pack terminal is connected to a positive terminal of a highest-potential battery cell in the plurality of battery cells, the current limiting circuit is connected to the positive terminal of the highest-potential battery cell, and the second battery pack terminal is connected to the current limiting circuit. In some embodiments, the electrical current that can be discharged from the first battery pack terminal is an average discharge current of at least 20 Amps. In some embodiments, the electrical current that can be discharged from the second battery pack terminal is limited by the current limiting circuit to less than 10 Amps. In some embodiments, the current limiting circuit includes a switch. In some embodiments, the switch includes a field-effect transistor. In some embodiments, an output voltage at the first battery pack terminal is approximately equal to an output voltage at the second battery pack terminal.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers" and "computing devices" described in the specification can include one or more processing units, one or more computer-readable medium modules, one or more input/output interfaces, and various connections (e.g., a system bus) connecting the components.

Other aspects of the embodiments will become apparent by consideration of the detailed description and accompanying drawings.

DETAILED DESCRIPTION

Embodiments described herein provide a battery pack for powering any one of a variety of different devices. The battery pack powers the devices by electrically connecting to the devices using at least one terminal. For example, the battery pack electrically connects to a first device using a high-current discharge terminal and a common ground terminal. The battery pack electrically connects to a second device using a low-current discharge terminal and the common ground terminal. Both the high- and low-current discharge terminals are connected to the highest potential battery cell of a plurality of battery cells in the battery pack. As a result, the output voltages of both the high- and low-current discharge terminals are substantially the same. However, a current limiting circuit (e.g., including a switch) is connected between the plurality of battery cells and the low-current discharge terminal for limiting the output current from the low-current discharge terminal.

Figure 1:
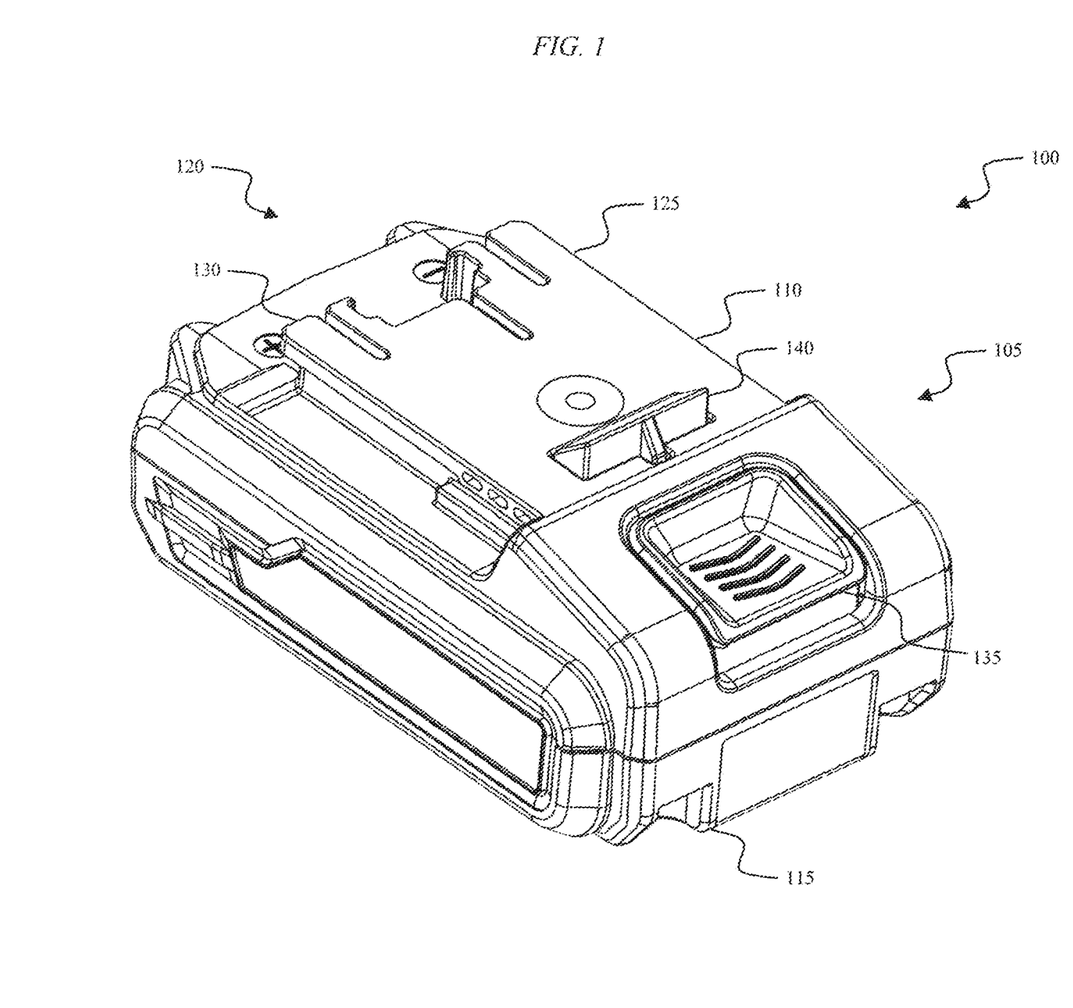
FIG. 1 is a perspective view of a battery pack, according to embodiments described herein.
Figure 2:
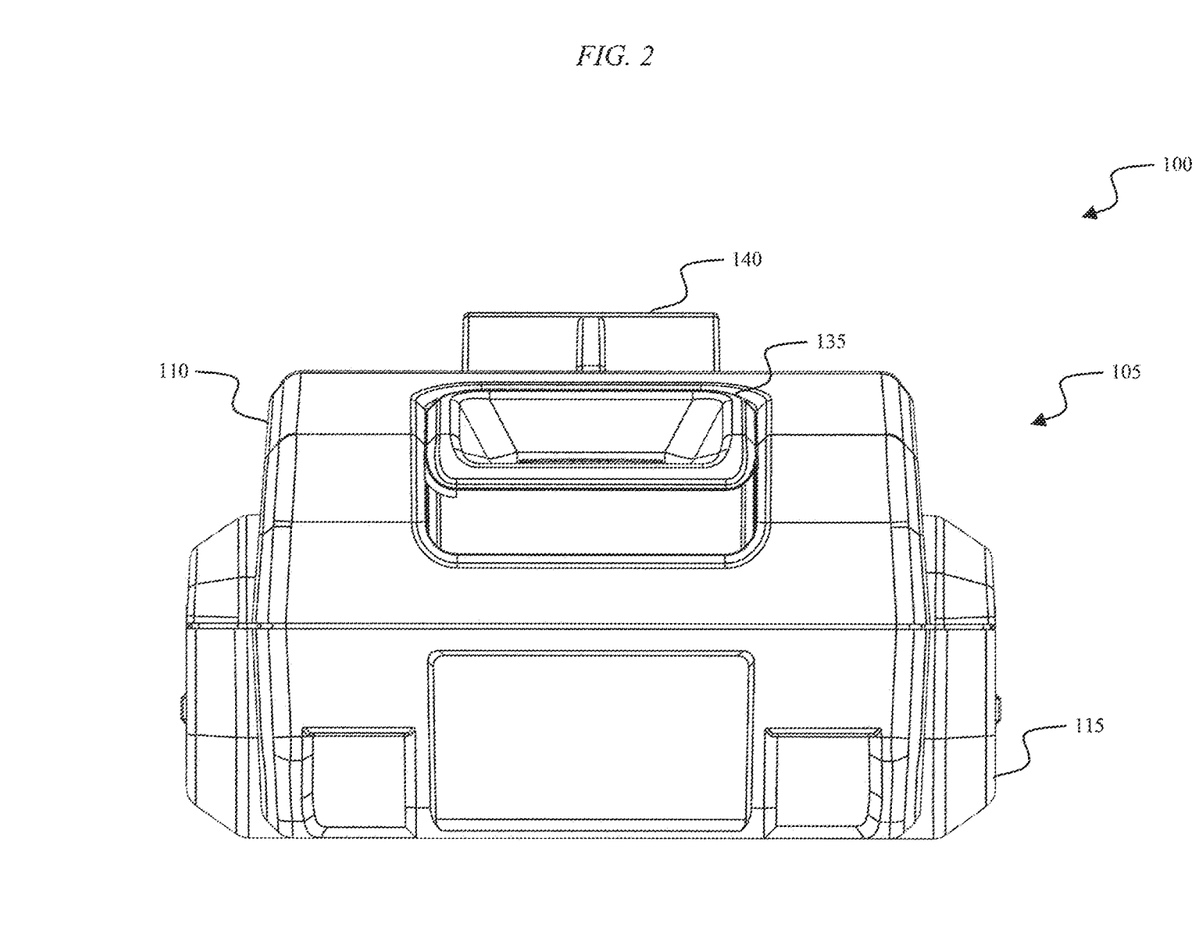
FIG. 2 is a front view of the battery pack of FIG. 1.

FIG. 1 illustrates a battery pack 100 that is connectable to and supportable by a cordless, hand-held power tool or another battery pack powered device. For example, the battery pack 100 is configured to be connectable to either high-current draw devices or low-current draw devices. The devices to which the battery pack 100 is configured to connect include a screwdriver, a drill driver, an impact driver, an impact wrench, a hammer drill, a jigsaw, a bolt cutter, an offset shear, a planar, a table saw, a miter saw, a grinder, a circular saw, a reciprocating saw, a rotary cutter, a scroll saw, a fan, a caulk gun, a drain auger, a hot glue gun, a transfer pump, a blower, a vacuum cleaner, a propane heater, a cement mixer, a sander, a router, a buffer, a nailer, a staple gun, a light, a speaker, a compressor, an inflator, etc.

As shown in FIGS. 1-7, the battery pack 100 includes a housing 105. The housing 105 includes a top housing portion 110 and a bottom housing portion 115. Although the battery pack 100 is illustrated in FIGS. 1-7 including the top housing portion 110 and the bottom housing portion 115, in some embodiments, the battery pack 100 includes a left housing portion and a right housing portion. The battery pack 100 also includes a support portion 120 for supporting the battery pack 100 on, and coupling the battery pack 100 to, a device such as a hand-held power tool. The support portion 120 includes a first rail 125 and a second rail 130 for slidably attaching the battery pack 100 to the device. The support portion 120 is connectable to a complementary support portion on the device (e.g., a battery pack receiving portion of a power tool). The battery pack 100 also includes a button 135 and a latch or coupling mechanism 140 for selectively coupling the battery pack 100 to, or releasing the battery pack 100 from, the device. In some embodiments, the button 135 and coupling mechanism 140 are considered to be included in the battery pack support portion 120.

Figure 3:
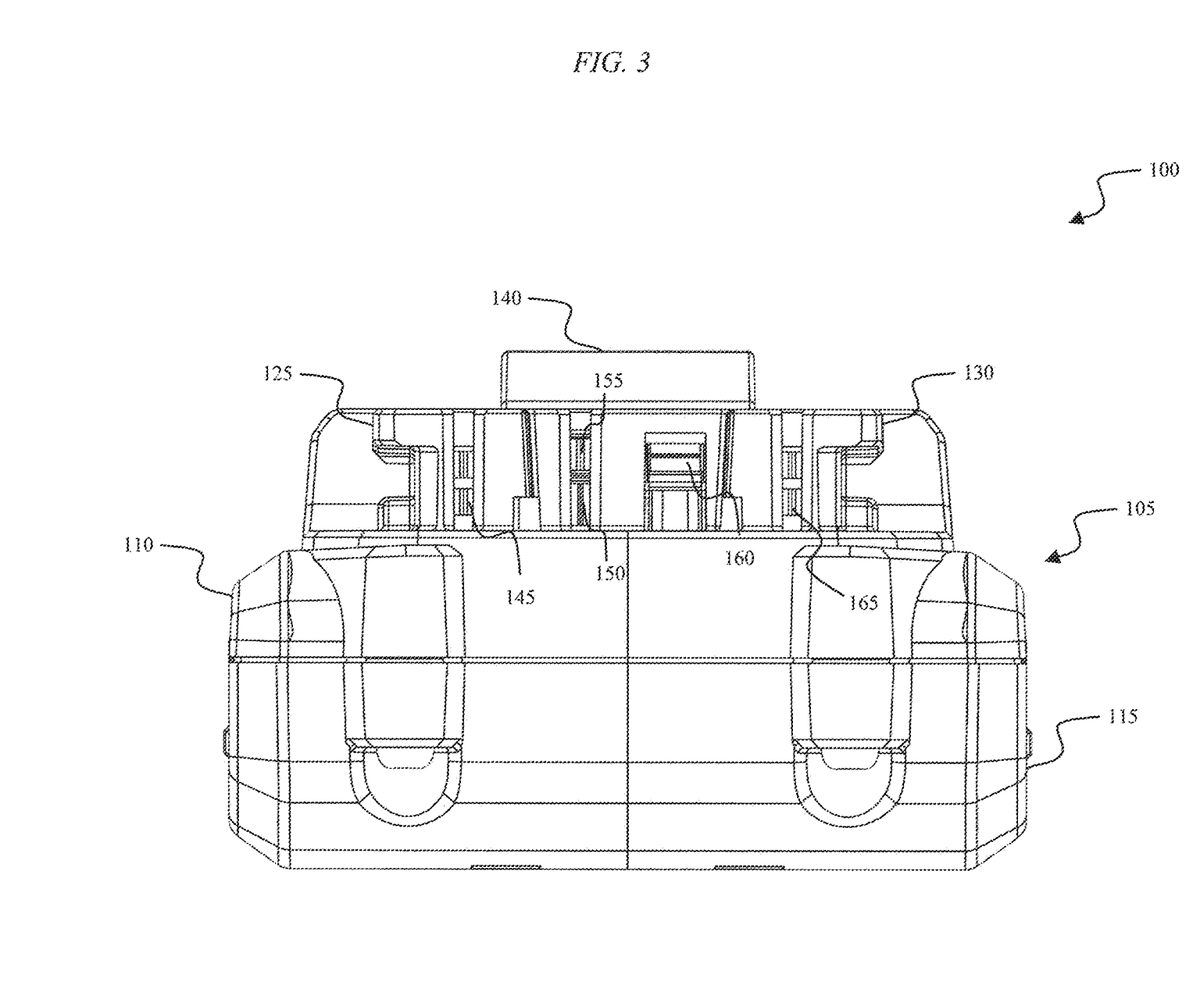
FIG. 3 is a rear view of the battery pack of FIG. 1.
Figure 4:
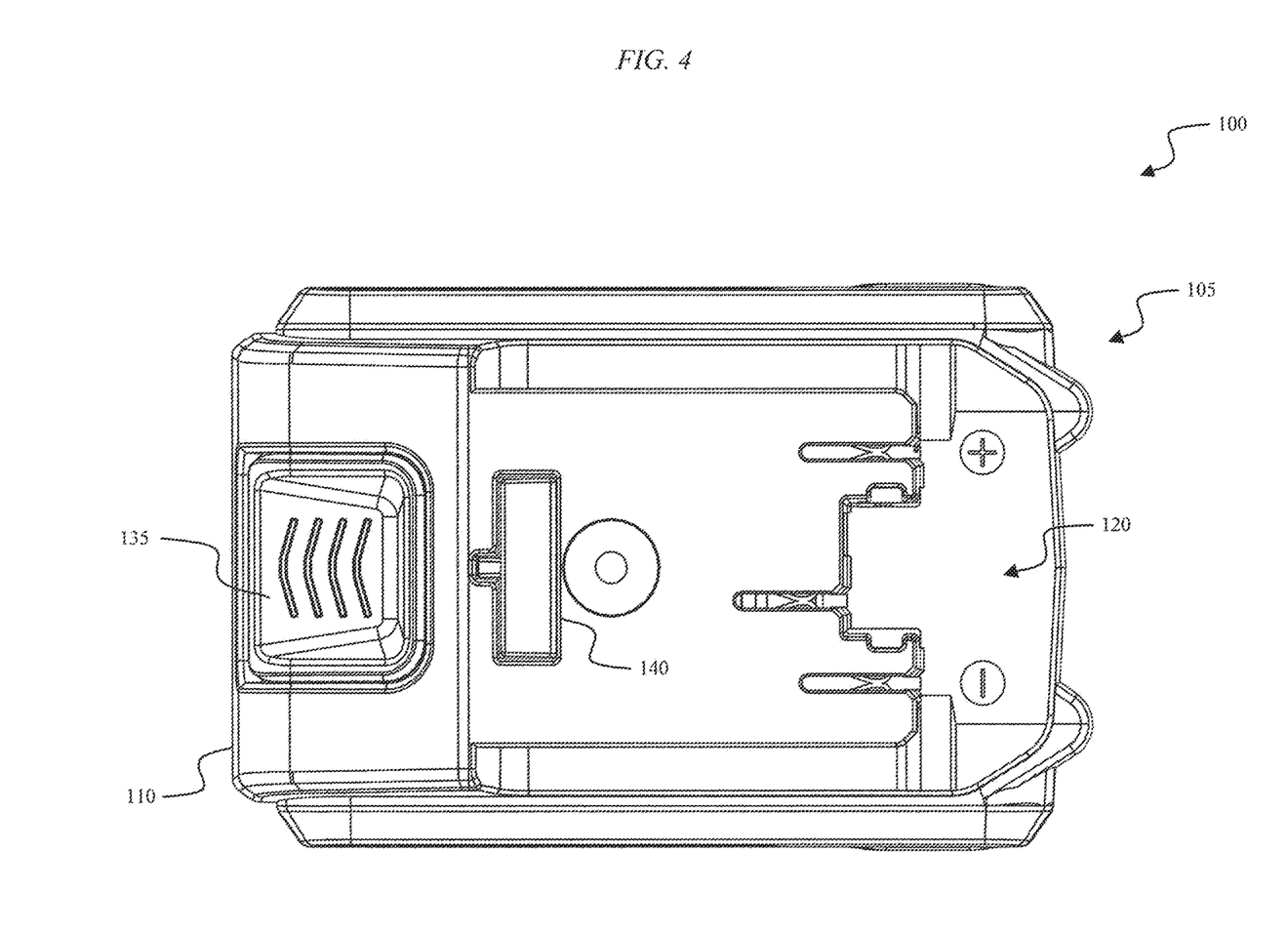
FIG. 4 is a top view of the battery pack of FIG. 1.

The battery pack 100 includes a plurality of terminals within the support portion 120 that are operable to electrically connect one or more battery cells within the battery pack 100 to the device. As illustrated in FIG. 3, the plurality of terminals include a first terminal 145, a second terminal 150, a third terminal 155, a fourth terminal 160, and a fifth terminal 165. In some embodiments, the first terminal 145 is a battery negative terminal, the second terminal 150 is a temperature terminal, the third terminal 155 is a communication terminal, the fourth terminal 160 is a low power or charging terminal, and the fifth terminal 165 is a battery positive terminal. In some embodiments, the second terminal 150 is the communication terminal and the third terminal 155 is a bypass terminal for bypassing a current sensing circuit.

The battery pack 100 is removably and interchangeably connected to a device, such as a hand-held power tool, to provide operational power to the device. The terminals 145, 150, 155, 160, and 165 are configured to mate with corresponding terminals extending from the device. The battery pack 100 substantially encloses and covers the terminals on the device when the pack 100 is positioned within a battery pack receiving portion of the device (i.e., the battery pack 100 functions as a cover for the opening and terminals of the device). Once the battery pack 100 is disconnected from the device, the terminals on the device are generally exposed to the surrounding environment. In this illustrated embodiment, the battery pack 100 is designed to substantially follow the contours of a hand-held power tool to match the general shape of an outer casing of a handle of the power tool, and the battery pack 100 generally increases (i.e., extends) the length of the grip of the power tool (e.g., a portion of the power tool below a motor).

Figure 5:
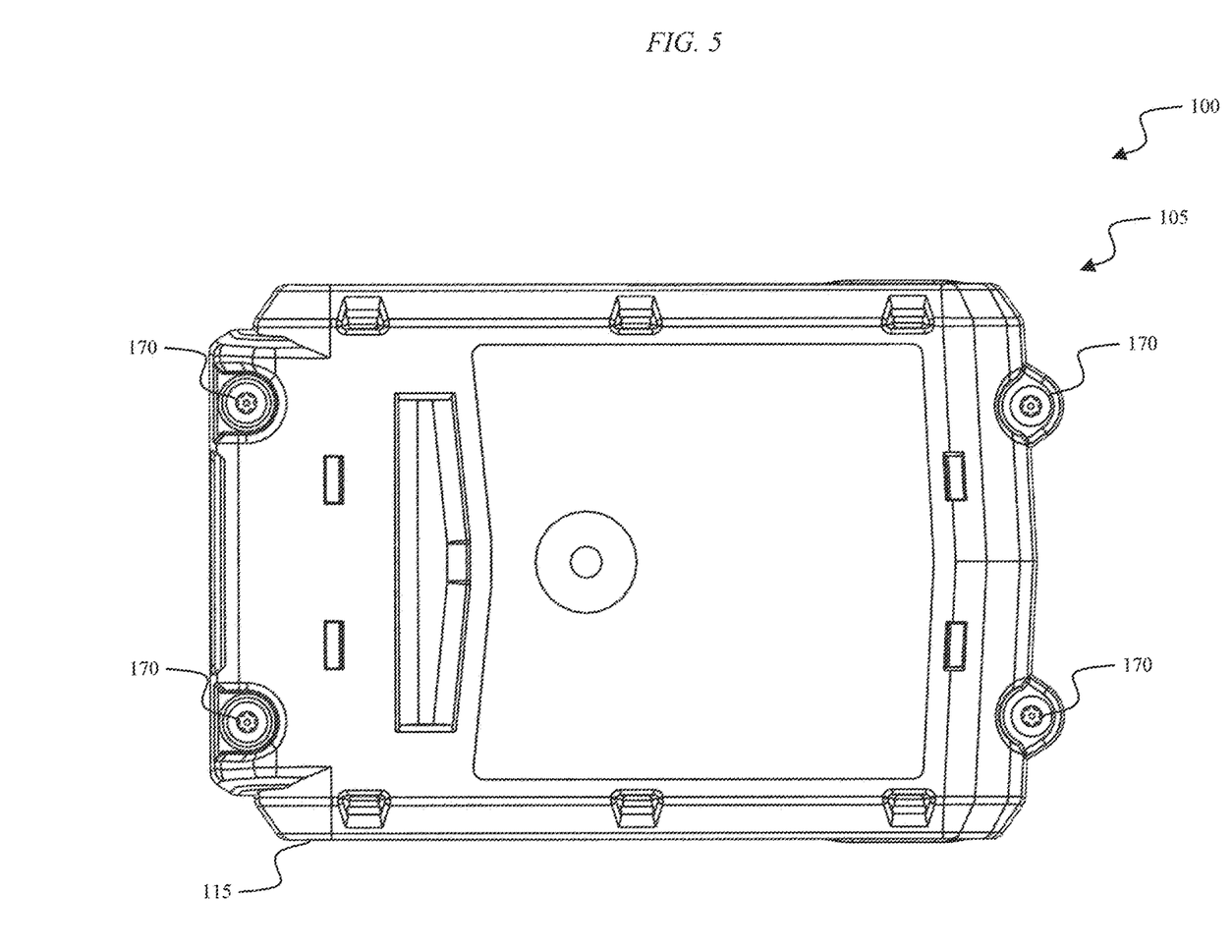
FIG. 5 is a bottom view of the battery pack of FIG. 1.
Figure 6:
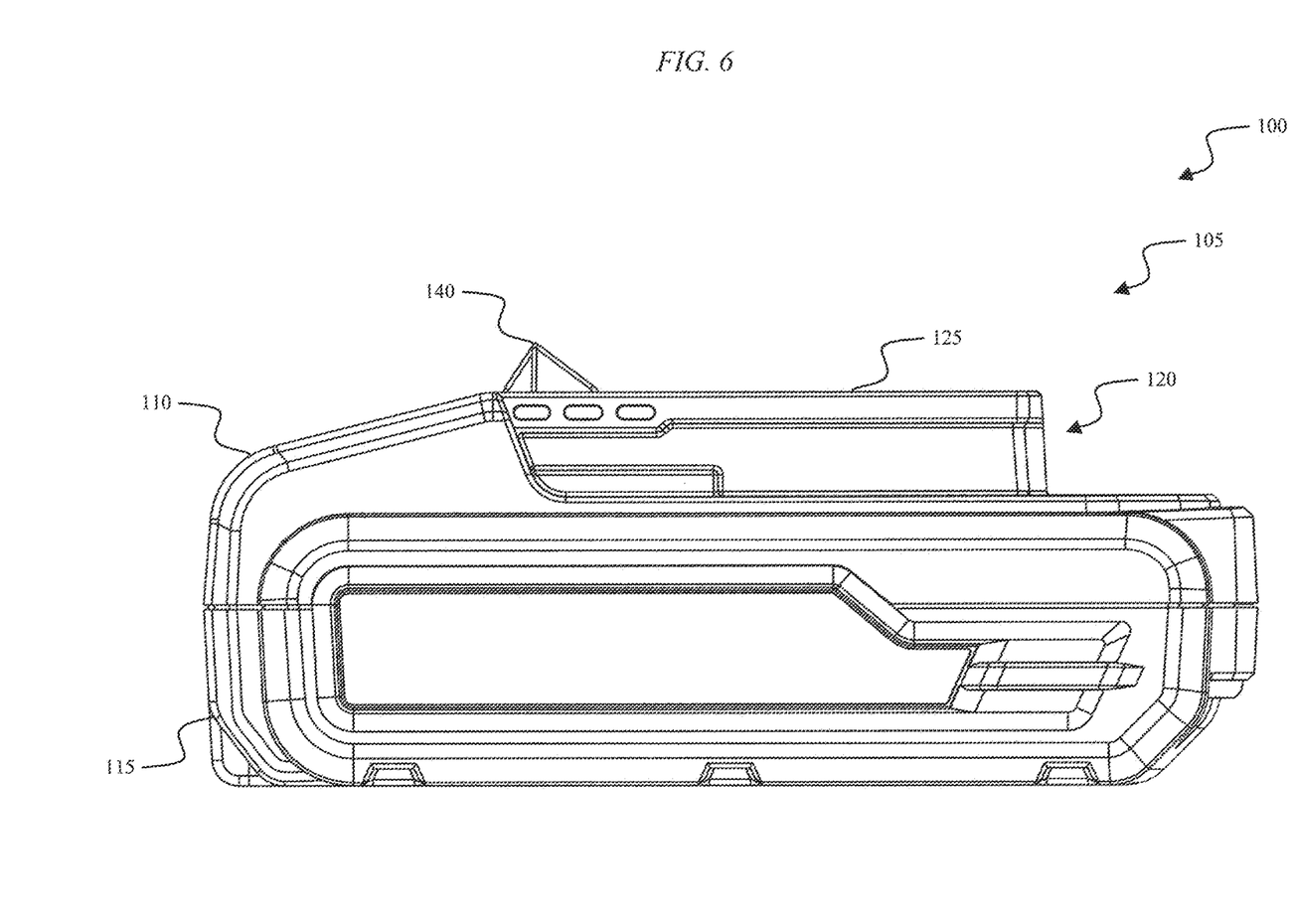
FIG. 6 is a right-side view of the battery pack of FIG. 1.
Figure 7:
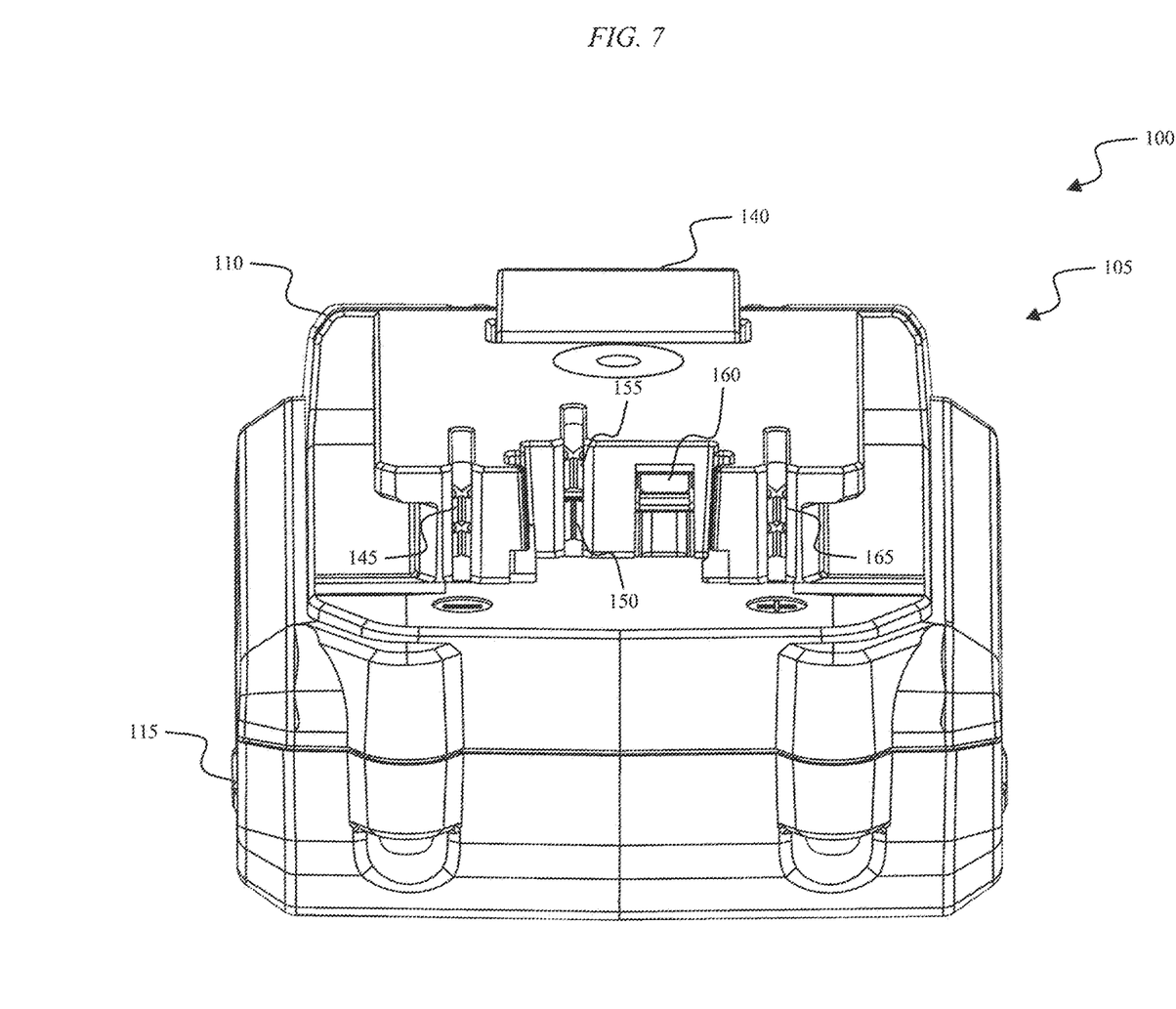
FIG. 7 is a rear-perspective view of the battery pack of FIG. 1.

As illustrated in FIG. 5, the bottom housing portion 115 of the housing 105 includes four fasteners 170 for fastening the bottom housing portion 115 to the top housing portion 110. For example, in some embodiments, the fasteners 170 are screws that extend vertically through apertures in the bottom housing portion 115 to engage a threaded aperture in the top housing portion 110. In other embodiments, the top housing portion 110 and the bottom housing portion 115 are fastened together in a different manner, such as using an adhesive or a fastener other than a screw.

Figure 8:
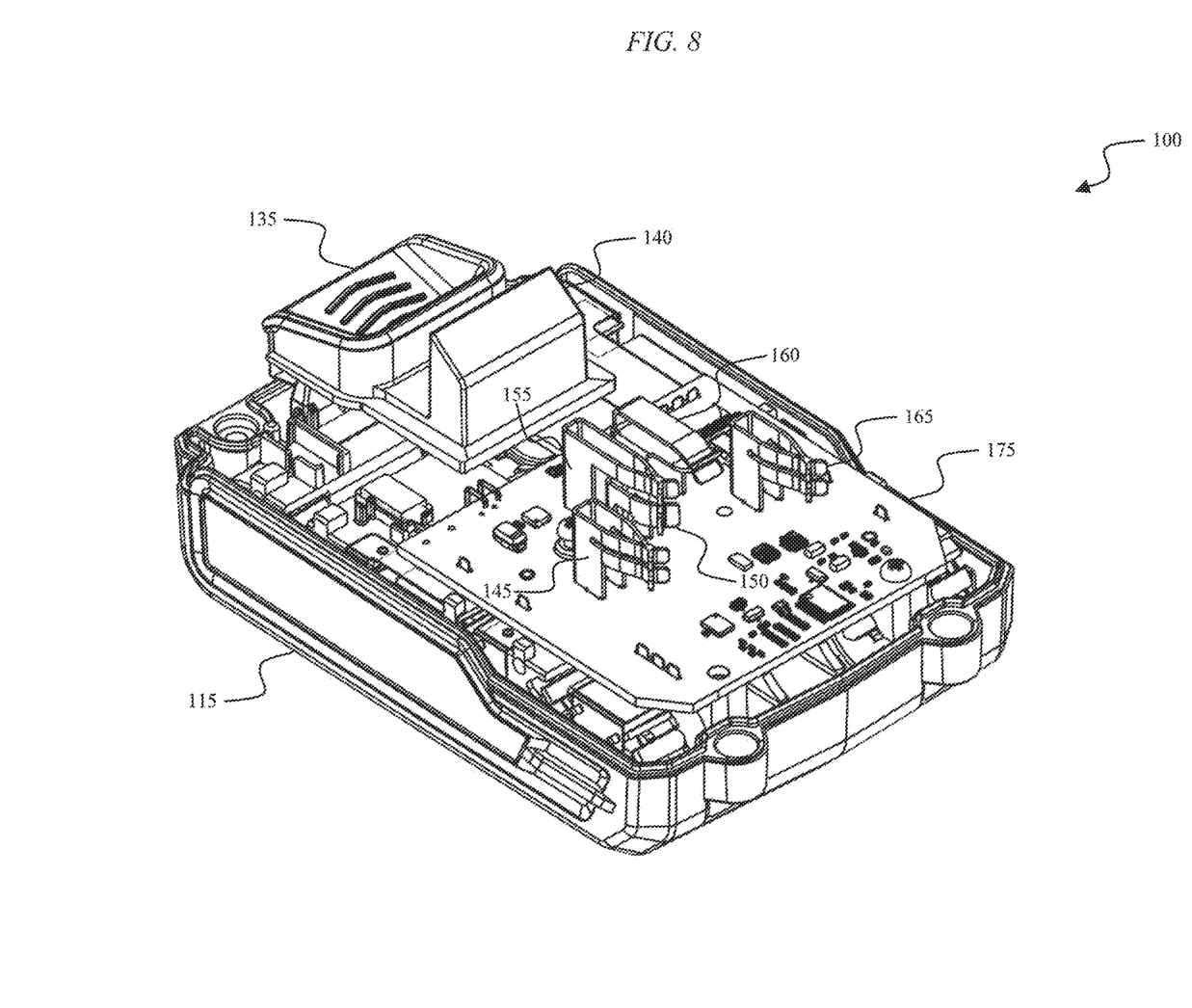
FIG. 8 is a perspective view of the battery pack of FIG. 1 with a top housing portion of the battery pack removed.

FIG. 8 illustrates the battery pack 100 with the top housing portion 110 removed. With the top housing portion 110 removed from the battery pack 100, the terminals 145, 150, 155, 160, and 165 and a printed circuit board ("PCB") 175 are exposed. In the illustrated embodiment, the first terminal 145 and fifth terminal 165 include first and second pairs of female blade terminals for receiving a male blade terminal from a device connected to the battery pack 100. The second terminal 150, the third terminal 155, and the fourth terminal 160 include a single pair of female blade terminals for receiving a male blade terminal from a device connected to the battery pack 100. In some embodiments, the first terminal 145 is used by low power devices and, when a device is connected to the first terminal 145, the battery pack 100 is configured to monitor a discharge current to the device. In such embodiments, the third terminal 155 can be sa bypass terminal that bypasses a discharge current monitoring circuit (e.g., when the battery pack 100 is connected to a high power device). Although five terminals 145, 150, 155, 160, and 165 are illustrated, a device connected to the battery pack 100 is not required to electrically connect to each of the terminals 145, 150, 155, 160, and 165. For example, in some embodiments, a low- or lower-powered device electrically connects to the first terminal 145 and the fourth terminal 160. In some embodiments, a charger for the battery pack 100 electrically connects to the first terminal 145, the third terminal 155, and the fourth terminal 160. In some embodiments, a high- or higher-powered device (e.g., a power tool) electrically connects to the first terminal 145, the third terminal 155, and the fifth terminal.

Figure 9:
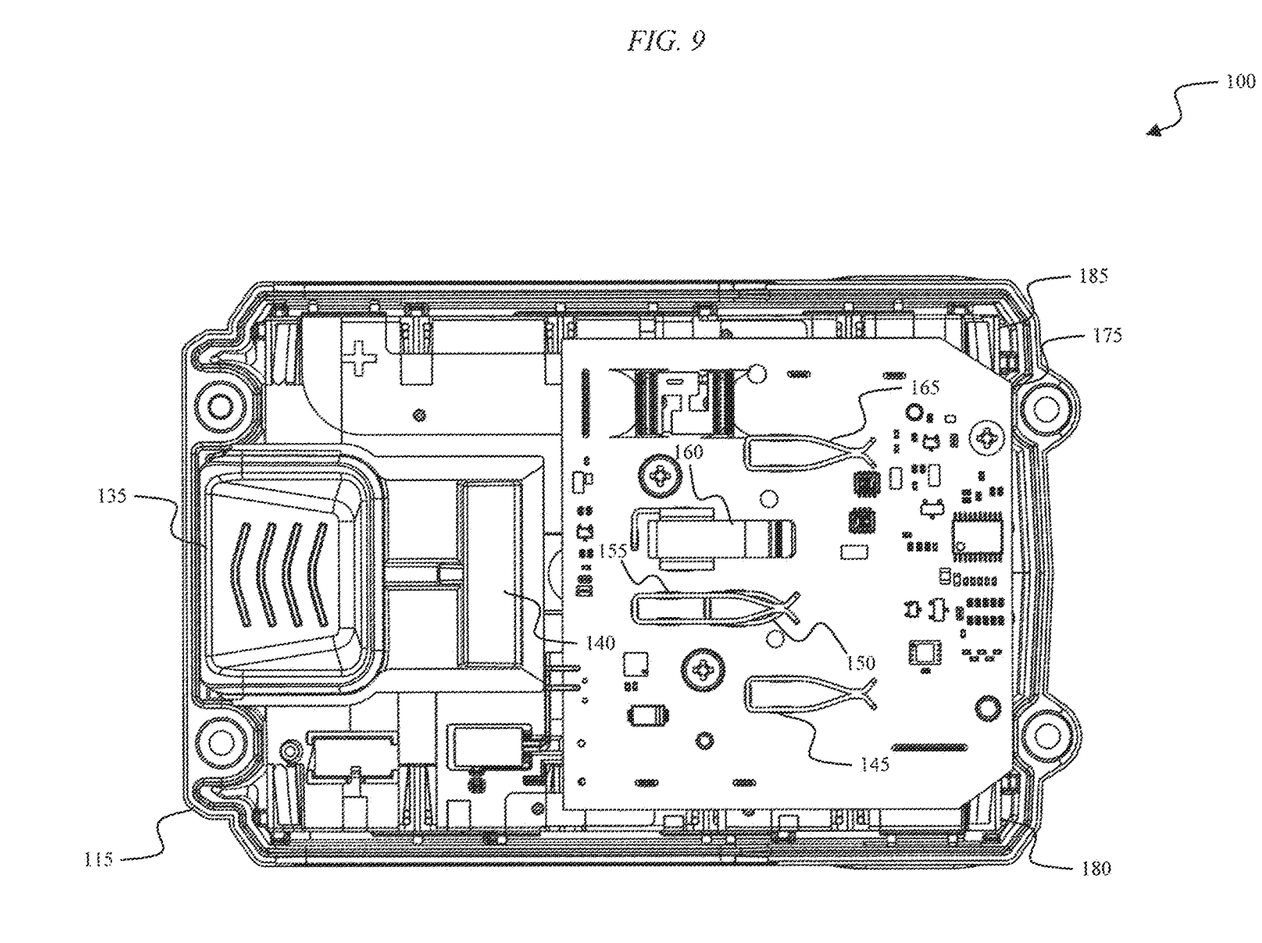
FIG. 9 is a top view of the battery pack of FIG. 8 with the top housing portion of the battery pack removed.
Figure 10:
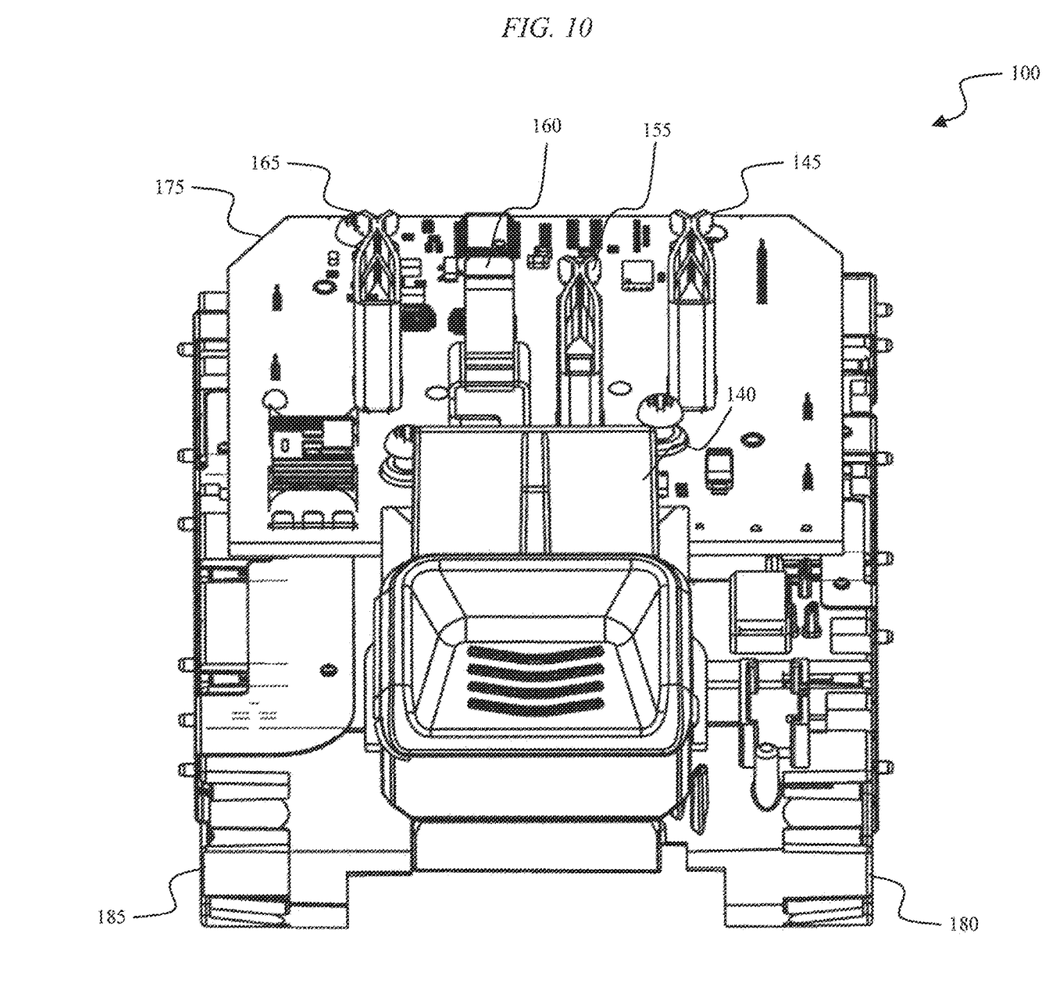
FIG. 10 is a front-perspective view of the battery pack of FIG. 8 with the top housing portion of the battery pack removed.

The battery pack 100 is configured to include a plurality of battery cells that are arranged and spaced apart from one another by a first battery cell holder 180 and a second battery cell holder 185, as illustrated in FIGS. 9 and 10. The first battery cell holder 180 receives a first end of the battery cells, and the second battery cell holder 185 receives a second end of the battery cells. As a result, the first battery cell holder 180 and the second battery cell holder 185 are configured to sandwich the battery cells and hold the battery cells within the battery pack housing 105. In some embodiments, the first battery cell holder 180 and the second battery cell holder 185 are configured as an upper cell holder and a lower cell holder such that the battery cells are sandwiched between the upper cell holder and the lower cell holder. In other embodiments, a single cell holder is used in place of the first cell holder 180 and the second cell holder 185.

In some embodiments, the battery pack 100 includes five battery cells 190. In other embodiments, the battery pack 100 includes more or fewer battery cells 190. The battery cells 190 can be arranged in series, parallel, or a series-parallel combination. For example, the battery pack 100 can include a total of five battery cells 190 configured in a series arrangement. In some embodiments, a series-parallel combination of battery cells 190 allows for an increased voltage and an increased capacity of the battery pack 100. In other embodiments, the battery pack 100 includes a different number of battery cells (e.g., between three and twelve battery cells) connected in series, parallel, or a series-parallel combination in order to produce a battery pack having a desired combination of nominal battery pack voltage and capacity.

Figure 11:
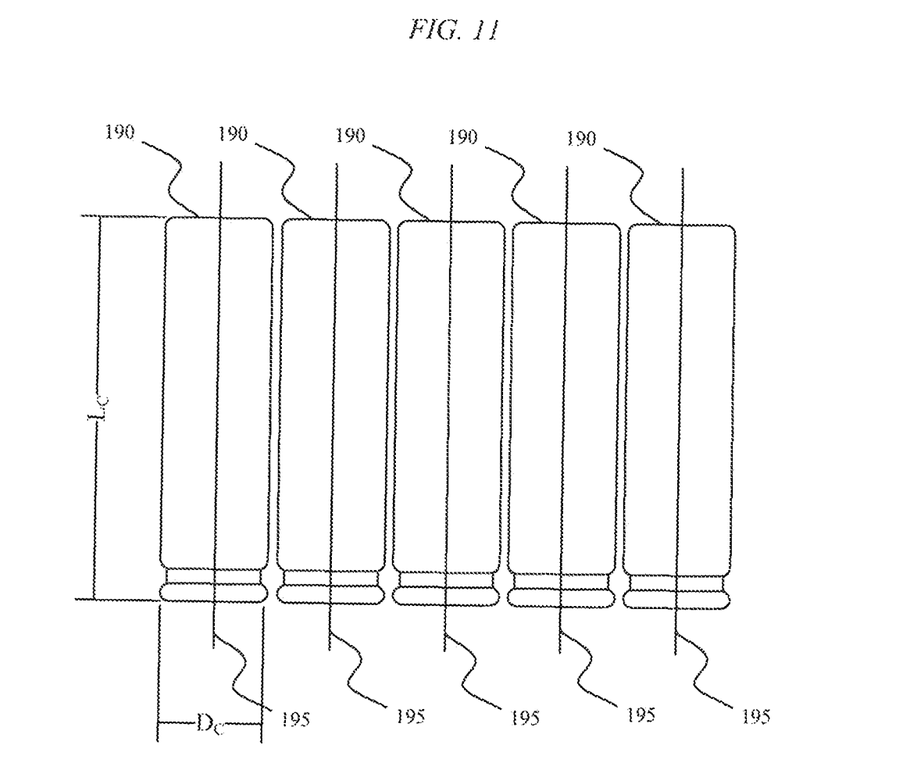
FIGS. 11 and 12 illustrate battery cells included in the battery pack of FIG. 1.
Figure 12:
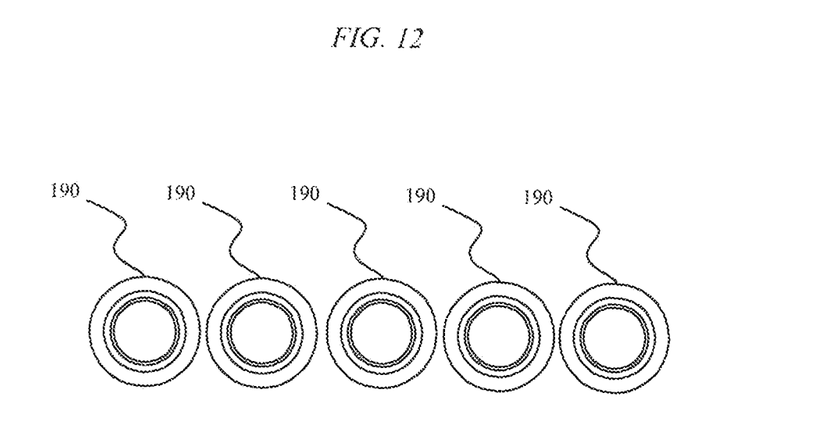

The battery cells 190 are, for example, cylindrical 18650 battery cells (18 mm diameter and 65 mm length). Each battery cell includes a cell axis 195, a cell length, $L_C$, and a cell diameter, $D_C$, as illustrated in FIGS. 11 and 12. In other embodiments, the battery cells 190 are, for example, cylindrical 14500 battery cells (14 mm diameter and 50 mm length), 14650 battery cells (14 mm diameter and 65 mm length), 17500 battery cells (17 mm diameter and 50 mm length), 17670 battery cells (17 mm diameter and 67 mm length), 18500 battery cells (18 mm diameter and 50 mm length), 21650 battery cells (21 mm diameter and 65 mm length), 21700 battery cells (21 mm diameter and 70 mm length), etc. Each battery cell 190 can be generally cylindrical and can extend along the cell axis 195 parallel to the cylindrical outer cell wall. Also, in the battery pack 100, each battery cell 190 can have a cell length, $L_C$, which is greater than or equal to two times the cell diameter, $D_C$.

The battery cells 190 are lithium-based battery cells having a chemistry of, for example, lithium-cobalt ("Li—Co"), lithium-manganese ("Li—Mn"), or Li—Mn spinel. In some embodiments, the battery cells 190 have other suitable lithium or lithium-based chemistries, such as a lithium-based chemistry that includes manganese, etc. The battery cells within the battery pack 100 provide operational power (e.g., voltage and current) to a device. In some embodiments, each battery cell 190 has a nominal voltage of approximately 3.6V, such that the battery pack 100 has a nominal voltage of approximately 18V. In other embodiments, the battery cells 190 have different nominal voltages, such as, for example, between 3.6V and 4.2V, and the battery pack has a different nominal voltage, such as, for example, 10.8V, 12V, 14.4V, 24V, 28V, 36V, 50V, between 10.8V and 100V, etc. The battery cells 190 also have a capacity of, for example, approximately between 1.0 Ah and 10.0 Ah. In exemplary embodiments, the battery cells have capacities of approximately, 1.5 Ah, 2.4 Ah, 3.0 Ah, 4.0 Ah, between 1.0 Ah and 10.0 Ah, etc.

The battery cells 190 are arranged and spaced apart from one another by the first battery cell holder 180 and the second battery cell holder 185 to reduce the cell-to-cell heat transfer between the battery cells 190 and to improve the collection and removal of heat from the battery cells 190. In this manner, the battery cells 190 may be able to be maintained in an appropriate temperature operating range (e.g., below 60° C.) for longer durations of use. The battery cells 190 are also arranged to provide an efficient use of space and to maintain a relatively small pack size.

Figure 13:
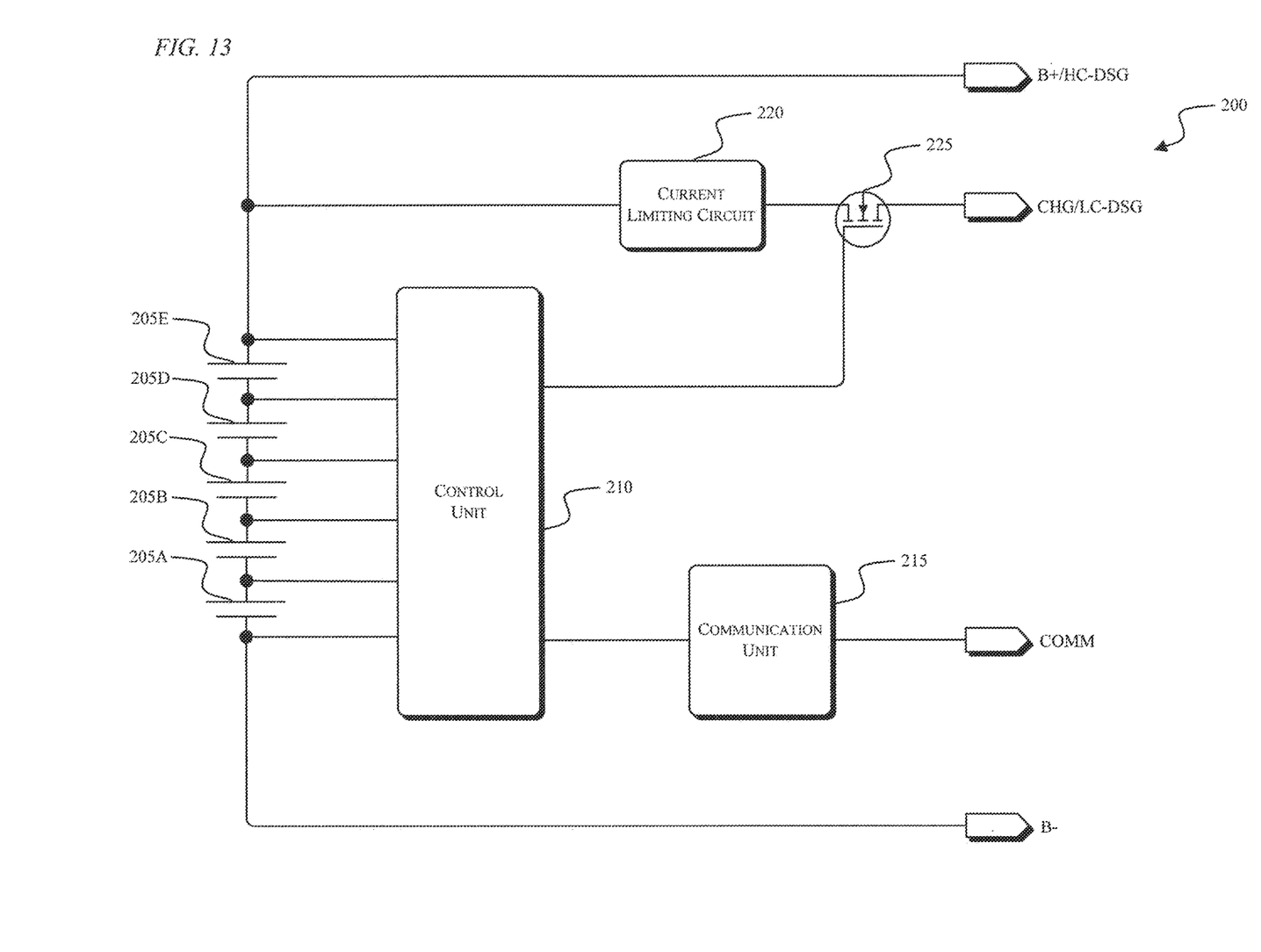
FIG. 13 is an electrical schematic diagram for the battery pack of FIG. 1, according to embodiments described herein.

FIG. 13 is an electrical schematic diagram of a circuit 200 for the battery pack 100. In the embodiment illustrated in FIG. 13, the circuit 200 includes a plurality of battery cells 205A-205E, a control unit 210 (e.g., a processing unit, a processor, a microcontroller, etc.), a communication unit 215, a current limiting circuit 220, a switch 225 (e.g., a field-effect transistor ["FET"]), and a plurality of terminals. The plurality of terminals include, for example, a battery pack positive power terminal ("B+"), a charge terminal ("CHG"), a communication terminal ("COMM"), and a battery pack negative power terminal ("B−"). In the embodiment illustrated in FIG. 13, the battery pack negative terminal, B−, is a common ground terminal for the battery pack 100. The battery pack negative terminal, B−, can be used in conjunction with either the battery pack positive terminal, B+, or the charge terminal, CHG. In the embodiment illustrated in FIG. 13, the battery pack positive terminal, B+, is configured as a high-current discharge terminal, HC-DSG, and the charge terminal, CHG, is additionally configured as a low-current discharge terminal, LC-DSG. As a result, the battery pack 100 is capable of outputting different levels of discharge current to different battery pack terminals.

For example, when the battery pack 100 is connected to a device that requires a high current output from the battery pack 100, the device can be configured to connect to the battery pack positive terminal, B+, and the battery pack negative terminal, B−. When the battery pack 100 is connected to a device that requires a lower current output from the battery pack 100, the lower power device can be configured to connect to the low-current discharge terminal, LC-DSG, and the battery pack negative terminal, B−. In some embodiments, the high-current discharge terminal, HC-DSG, is capable of providing discharge currents of at least 20 Amps (e.g., as an average discharge current over the rated capacity of the battery pack 100). As a result, the battery pack 100 is capable of providing discharge currents that are sufficient for powering high power devices, such as power tools. In some embodiments, the low-current discharge terminal, LC-DSG, is capable of providing discharge currents of up to 5 Amps or up to 10 Amps. As a result, the battery pack 100 is also capable of providing a lower discharge current to a device that requires less current to operate than, for example, a power tool. Both the high-current discharge terminal, HC-DSG, and the low-current discharge terminal, LC-DSG, have output voltages of approximately the same value (e.g., 18V+/−0.5V).

As shown in the embodiment of FIG. 13, the high-current discharge terminal, HC-DSG, is directly connected to the positive end of the highest potential battery cell 205E of the plurality of battery cells 205A-205E. The low-current discharge terminal, LC-DSG, is connected to the highest potential battery cell 205E of the plurality of battery cells 205A-205E through the current limiting circuit 220 and the switch 225. In some embodiments, the switch 225 is included in the current limiting circuit 220. The current limiting circuit 220 and/or the switch 225 are configured to limit a discharge current from the battery cells 205A-205E that is output through the low-current discharge terminal, LC-DSG. The current limiting circuit 220 includes active and or passive components (e.g., resistors, capacitors, diodes, transistors, etc.) that are operable to reduce and/or limit the current output of the low-current discharge terminal, LC-DSG. In some embodiments, the switch 225 is used to reduce or limit the current output of the low-current discharge terminal, LC-DSG. For example, the control unit 210 is configured to control a switching state of the switch 225 to regulate a duty cycle of the signal output from the low-current discharge terminal, LC-DSG. By controlling the switch 225, the control unit 210 is able to reduce the output current output from the low-current discharge terminal, LC-DSG.

In some embodiments, the switch 225 includes a FET for limiting the current output of the low-current discharge terminal, LC-DSG. As is generally known in the art, a FET has a source terminal, a drain terminal, and a gate terminal. The battery pack 100 is configured to electrically connect to the drain terminal of the FET. The low-current discharge terminal, LC-DSG, is configured to electrically connect to the source of the FET. With the increase of the current output of the low-current discharge terminal, LC-DSG, the operation of the field-effect transistor switches from a variable resistance region to a saturation region. In the variable resistance region, as the drain-source resistance is small, the current output of the low-current discharge terminal, LC-DSG is not affected. In the saturation region, the drain-source voltage increases significantly with the current output of the low-current discharge terminal, LC-DSG. Hence the drain-source resistance works like a variable resistance having a large resistance value, which provides a function of limiting the output of the low-current discharge terminal, LC-DSG.

Although the current from the low-current discharge terminal, LC-DSG, is reduced, the voltage at the low-current discharge terminal, LC-DSG, is substantially the same as the voltage at the high-current discharge terminal, HC-DSG (e.g., 18V). In other embodiments, the switch 225 is used in conjunction with the current limiting circuit to reduce or limit the current output of the low-current discharge terminal, LC-DSG.

In some embodiments, the battery pack 100 is configured to connect to a device using each of the high-current discharge terminal, HC-DSG, and the low-current discharge terminal, LC-DSG. For example, the battery pack can be configured to output a higher discharge current to a device for a primary operation (e.g., powering a motor) using the high-current discharge terminal, HC-DSG. The battery pack can also be configured to output a lower discharge current to the device for a secondary operation (e.g., powering a control or processing unit) using the low-current discharge terminal, LC-DSG. As such, in some embodiments, the battery pack 100 is not prevented from outputting discharge currents to both the high-current discharge terminal, HC-DSG and the low-current discharge terminal, LC-DSG. In other embodiments, the battery pack 100 is prevented from outputting discharge currents to both the high-current discharge terminal, HC-DSG and the low-current discharge terminal, LC-DSG.

Thus, embodiments described herein provide, among other things, a battery pack that includes a high-current discharge terminal and a low-current discharge terminal. Various features and advantages are set forth in the following claims.

What is claimed is:

1. A battery pack comprising:
   a housing including a battery pack support portion configured to removably mechanically connect the battery pack to a device, the battery pack support portion including a first rail, a second rail, and a coupling mechanism for securing the battery pack to the device;
a plurality of battery cells located within the housing, the plurality of battery cells including a highest-potential battery cell and a lowest-potential battery cell;
a current limiting circuit connected to a positive terminal of the highest-potential battery cell;
a first battery pack terminal configured to electrically connect the battery pack to the device, the first battery pack terminal connected to the positive terminal of the highest-potential battery cell;
a second battery pack terminal configured to electrically connect the battery pack to the device, the second battery pack terminal connected to the current limiting circuit; and
a third battery pack terminal configured to electrically connect the battery pack to the device, the third battery pack terminal connected to a negative terminal of the lowest-potential battery cell,
wherein the current limiting circuit limits an electrical current that can be discharged from the second battery pack terminal to a value that is lower than an electrical current that can be discharged from the first battery pack terminal, and
wherein an output voltage at the first battery pack terminal is approximately equal to an output voltage at the second battery pack terminal.

2. The battery pack of claim 1, wherein the electrical current that can be discharged from the first battery pack terminal is an average discharge current of at least 20 Amps.

3. The battery pack of claim 2, wherein the electrical current that can be discharged from the second battery pack terminal is limited by the current limiting circuit to less than 10 Amps.

4. The battery pack of claim 1, wherein the current limiting circuit includes a switch.

5. The battery pack of claim 4, wherein the switch includes a field-effect transistor.

6. The battery pack of claim 1, the battery pack further comprising a fourth battery pack terminal configured to electrically connect the battery pack to the device, wherein the fourth battery pack terminal is a temperature terminal.

7. The battery pack of claim 1, the battery pack further comprising a fourth battery pack terminal configured to electrically connect the battery pack to the device, wherein the fourth battery pack terminal is a communication terminal.

8. The battery pack of claim 1, wherein the output voltage of the first battery pack terminal is approximately 18 Volts, and the output voltage at the second battery pack terminal is approximately 18 Volts.

9. A battery pack comprising:
a housing including a battery pack support portion configured to removably mechanically connect the battery pack to a device, the battery pack support portion including a first rail, a second rail, and a coupling mechanism for securing the battery pack to the device;
a plurality of battery cells located within the housing;
a current limiting circuit connected to the plurality of battery cells;
a first battery pack terminal configured to electrically connect the battery pack to the device, the first battery pack terminal connected to the plurality of battery cells;
a second battery pack terminal configured to electrically connect the battery pack to the device, the second battery pack terminal connected to the current limiting circuit; and
wherein the current limiting circuit limits an electrical current that can be discharged from the second battery pack terminal to a value that is lower than an electrical current that can be discharged from the first battery pack terminal, and
wherein an output voltage at the first battery pack terminal is approximately equal to an output voltage at the second battery pack terminal.

10. The battery pack of claim 9, wherein:
the first battery pack terminal is connected to a positive terminal of a highest-potential battery cell in the plurality of battery cells;
the current limiting circuit is connected to the positive terminal of the highest-potential battery cell; and
the second battery pack terminal is connected to the current limiting circuit.

11. The battery pack of claim 9, wherein the electrical current that can be discharged from the first battery pack terminal is an average discharge current of at least 20 Amps.

12. The battery pack of claim 11, wherein the electrical current that can be discharged from the second battery pack terminal is limited by the current limiting circuit to less than 10 Amps.

13. The battery pack of claim 9, wherein the current limiting circuit includes a switch.

14. The battery pack of claim 13, wherein the switch includes a field-effect transistor.

15. A battery pack comprising:
a housing including a battery pack support portion configured to removably mechanically connect the battery pack to a device;
a plurality of battery cells located within the housing;
a current limiting circuit connected to the plurality of battery cells;
a first battery pack terminal configured to electrically connect the battery pack to the device, the first battery pack terminal connected to the plurality of battery cells; and
a second battery pack terminal configured to electrically connect the battery pack to the device, the second battery pack terminal connected to the current limiting circuit,
wherein the current limiting circuit limits an electrical current that can be discharged from the second battery pack terminal to a value that is lower than an electrical current that can be discharged from the first battery pack terminal, and
wherein an output voltage at the first battery pack terminal is approximately equal to an output voltage at the second battery pack terminal.

16. The battery pack of claim 15, wherein:
the first battery pack terminal is connected to a positive terminal of a highest-potential battery cell in the plurality of battery cells;
the current limiting circuit is connected to the positive terminal of the highest-potential battery cell; and
the second battery pack terminal is connected to the current limiting circuit.

17. The battery pack of claim 15, wherein the electrical current that can be discharged from the first battery pack terminal is an average discharge current of at least 20 Amps.

18. The battery pack of claim 17, wherein the electrical current that can be discharged from the second battery pack terminal is limited by the current limiting circuit to less than 10 Amps.

19. The battery pack of claim 15, wherein the current limiting circuit includes a switch.

20. The battery pack of claim 19, wherein the switch includes a field-effect transistor.

\* \* \* \* \*